(12) United States Patent
Mowad et al.

(10) Patent No.: US 10,099,260 B1
(45) Date of Patent: Oct. 16, 2018

(54) BRUSH HAVING FERROMAGNETIC BRISTLES AND MAGNET

(71) Applicants: Antoine Mowad, Waterbury, CT (US); Frank C. DiBona, Prospect, CT (US)

(72) Inventors: Antoine Mowad, Waterbury, CT (US); Frank C. DiBona, Prospect, CT (US)

( * ) Notice: Subject to any disclaimer, the term of this patent is extended or adjusted under 35 U.S.C. 154(b) by 82 days.

(21) Appl. No.: 15/281,510

(22) Filed: Sep. 30, 2016

(51) Int. Cl.
| | |
|---|---|
| *A47L 13/00* | (2006.01) |
| *B08B 1/00* | (2006.01) |
| *A47J 37/07* | (2006.01) |
| *A46D 1/00* | (2006.01) |
| *A46B 9/02* | (2006.01) |

(52) U.S. Cl.
CPC .............. *B08B 1/002* (2013.01); *A46B 9/026* (2013.01); *A46D 1/0207* (2013.01); *A47J 37/0786* (2013.01); *B08B 1/006* (2013.01)

(58) Field of Classification Search
USPC .................... 15/11, 114, 160, 236.05, 236.06
See application file for complete search history.

(56) References Cited

U.S. PATENT DOCUMENTS

| | | | |
|---|---|---|---|
| 201,688 A | 3/1878 | Leiner | |
| D366,962 S | * 2/1996 | Whitaker | ....................... D32/42 |
| D400,328 S | 10/1998 | Zemel | |
| D456,614 S | 5/2002 | Zemel | |
| D468,107 S | 1/2003 | Shen | |
| D590,600 S | 4/2009 | Dow | |
| D595,057 S | 6/2009 | Dow | |
| D652,629 S | 1/2012 | Zemel | |
| D663,531 S | * 7/2012 | Zemel | ........................... D4/131 |
| 8,516,644 B2 | 8/2013 | Witzel | |
| 8,806,698 B2 | 8/2014 | Enders | |
| 9,125,480 B2 | 9/2015 | Guido | |
| D766,585 S | * 9/2016 | Cornett | ......................... D4/119 |
| 2005/0011030 A1 | * 1/2005 | Gonzalez | ................. A46B 5/02 15/160 |
| 2005/0160544 A1 | 7/2005 | Geller | |
| 2006/0207042 A1 | * 9/2006 | Di Paolo | .............. A46B 5/0095 15/111 |
| 2011/0135380 A1 | * 6/2011 | Wales | .................. A46B 5/0008 401/276 |

FOREIGN PATENT DOCUMENTS

JP   2005103214   4/2005

* cited by examiner

*Primary Examiner* — Joseph J Hail
*Assistant Examiner* — Shantese McDonald
(74) *Attorney, Agent, or Firm* — Raymond A. Nuzzo

(57) ABSTRACT

In some embodiments, the present invention is directed to a wire bristle brush comprising a handle, a head attached to the handle wherein the head has a first face and a second face, ferromagnetic brush bristles attached to the first face of the head, and a magnet attached to the head for magnetically attracting loose brush bristles that have become dislodged from the first face of the head.

9 Claims, 9 Drawing Sheets

BRUSH HAVING FERROMAGNETIC BRISTLES AND MAGNET

STATEMENT OF GOVERNMENT INTEREST

Not applicable.

CROSS REFERENCE TO OTHER PATENT APPLICATIONS

None.

TECHNICAL FIELD

The present invention generally relates to wire bristle brushes and grill brushes.

BACKGROUND

Wire grill brushes are commonly used to clean the cooking grates in cooking grills such as barbecue grills. These wire grill brushes typically utilize a plurality of wire bristles that are attached to the head portion of the brush. However, a significant problem with such wire grill brushes is that wire bristles typically become dislodged from the head portion of the brush and become stuck to the cooking grates. These loose wire bristles can become attached to the food that is being cooked on the grill. As a result, a person can ingest the wire bristles thereby causing injuries to that person's mouth, gums, throat, esophagus and stomach. In many cases, such injuries can become life-threatening and may require surgery. A study published in the journal "Otolaryngology—Head and Neck Surgery", April 2016, Vol. 154, pp. 645-649, "Epidemiology of Wire-Bristle Grill Brush Injury In The United States, 2002-2014" (Tiffany P. Baugh, Jamie B. Hadley and C. W. David Chang) utilized data from The Consumer Product Safety Commission's National Electronic Surveillance System to determine that there were almost 1,700 grill brush injury-related visits to U.S. emergency rooms between 2002 and 2014. That estimate does not include people who were seen at urgent care or other outpatient facilities.

What is needed is a new and improved wire grill brush that eliminates the foregoing problems associated with prior art grill brushes.

SUMMARY

In some embodiments, the present invention is directed to a grill brush that comprises a handle, a head attached to the handle wherein the head has a first face and a second face and a plurality of brush members attached to the first face of the head. Each brush member comprises ferromagnetic brush bristles for contacting a cooking grate. The grill brush further comprises a magnet attached to the head for magnetically attracting loose brush bristles that have become dislodged from the brush members and positioned or stuck on the cooking grate. The head has a front end and a rear end. The handle is attached to the rear end of the head. In some embodiments, the magnet is attached to the second face of the head. In other embodiments, the magnet is attached to the front end of the head. The first face of the head has a front edge and a rear edge. The brush members are spaced apart on the first face of the head. A first one of the plurality of brush members is substantially parallel to the front edge of the head, a second one of the plurality of brush members is substantially parallel to the rear edge of the head and the remaining ones of the plurality of brush members are positioned between the first one of the plurality of brush members and the second one of the plurality of brush members. In one embodiment, the remaining ones of the plurality of brush members are substantially perpendicular to the first one of the plurality of brush members and the second one of the plurality of brush members.

In some embodiments, the present invention is directed to a wire bristle brush comprising a handle, a head attached to the handle wherein the head has a first face and a second face, ferromagnetic brush bristles attached to the first face of the head, and a magnet attached to the head for magnetically attracting loose brush bristles that have become dislodged from the first face of the head. The head has a front end and a rear end. The handle is attached to the rear end of the head. In some embodiments, the magnet is attached to the second face of the head. In other embodiments, the magnet is attached to the front end of the head.

DETAILED DESCRIPTION

Figure 1:
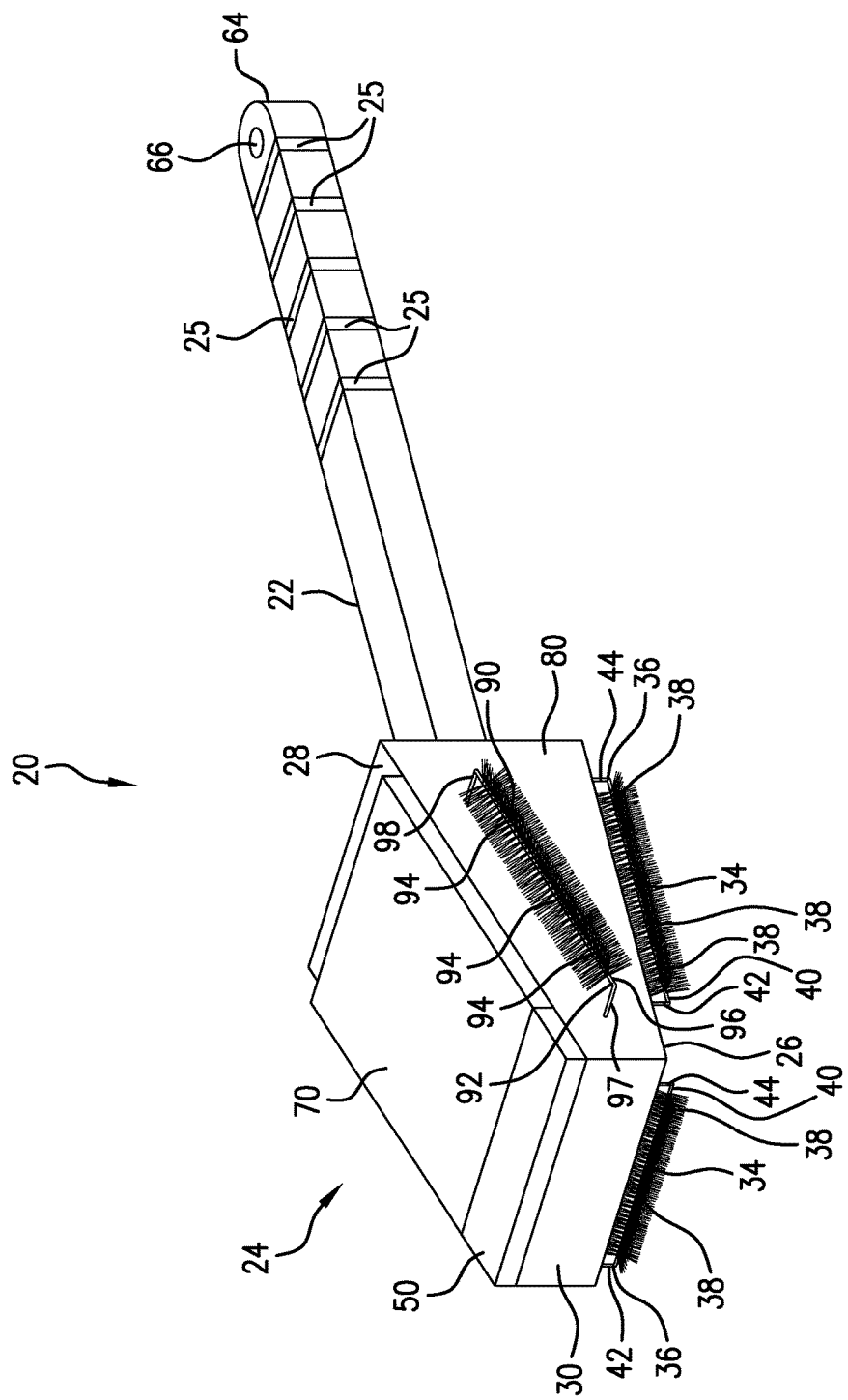
FIG. 1 is a perspective view of a grill brush in accordance with one embodiment of the present invention.
Figure 2:
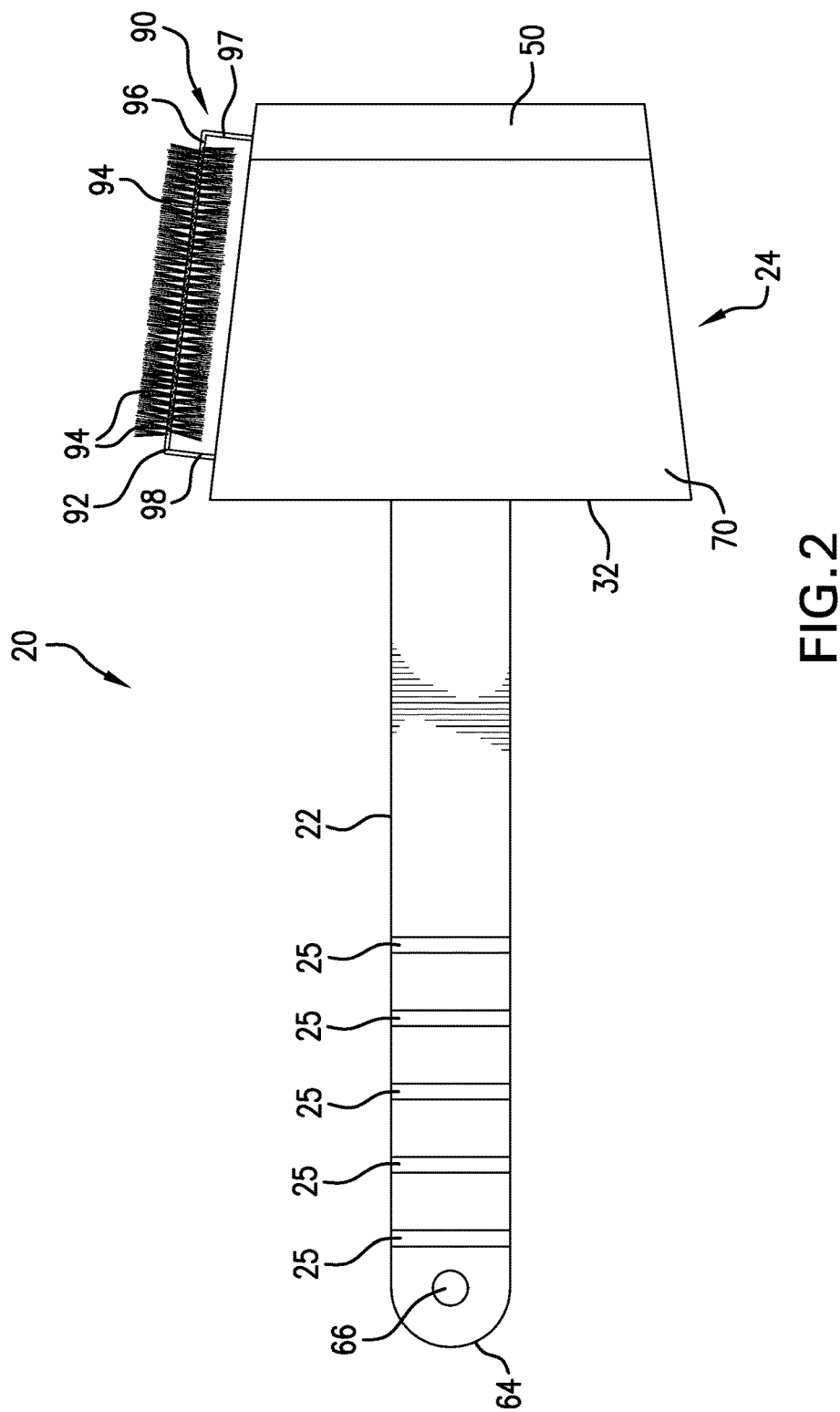
FIG. 2 is a top plan view of the grill brush.
Figure 3:
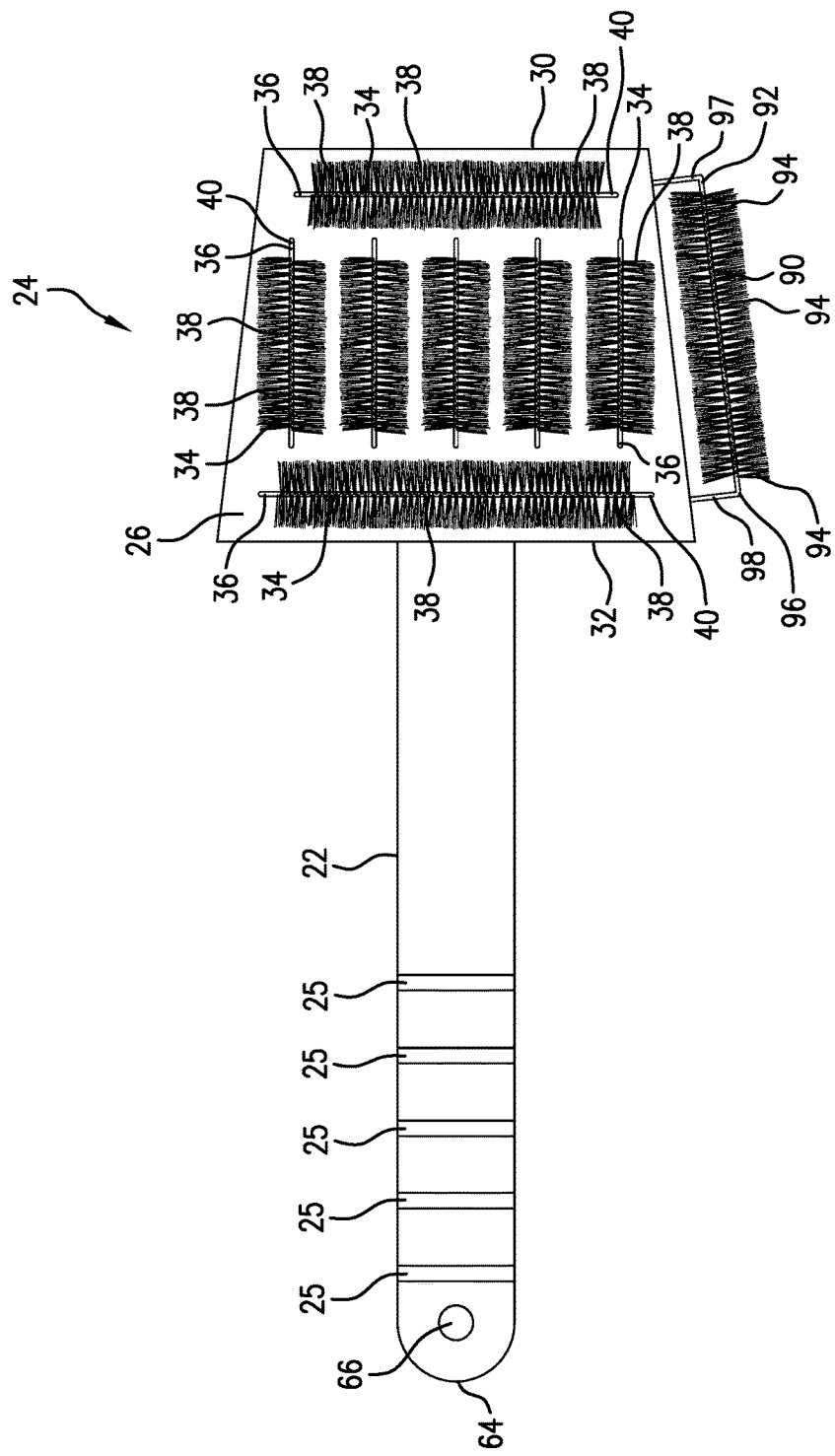
FIG. 3 is a bottom view of the grill brush.
Figure 4:
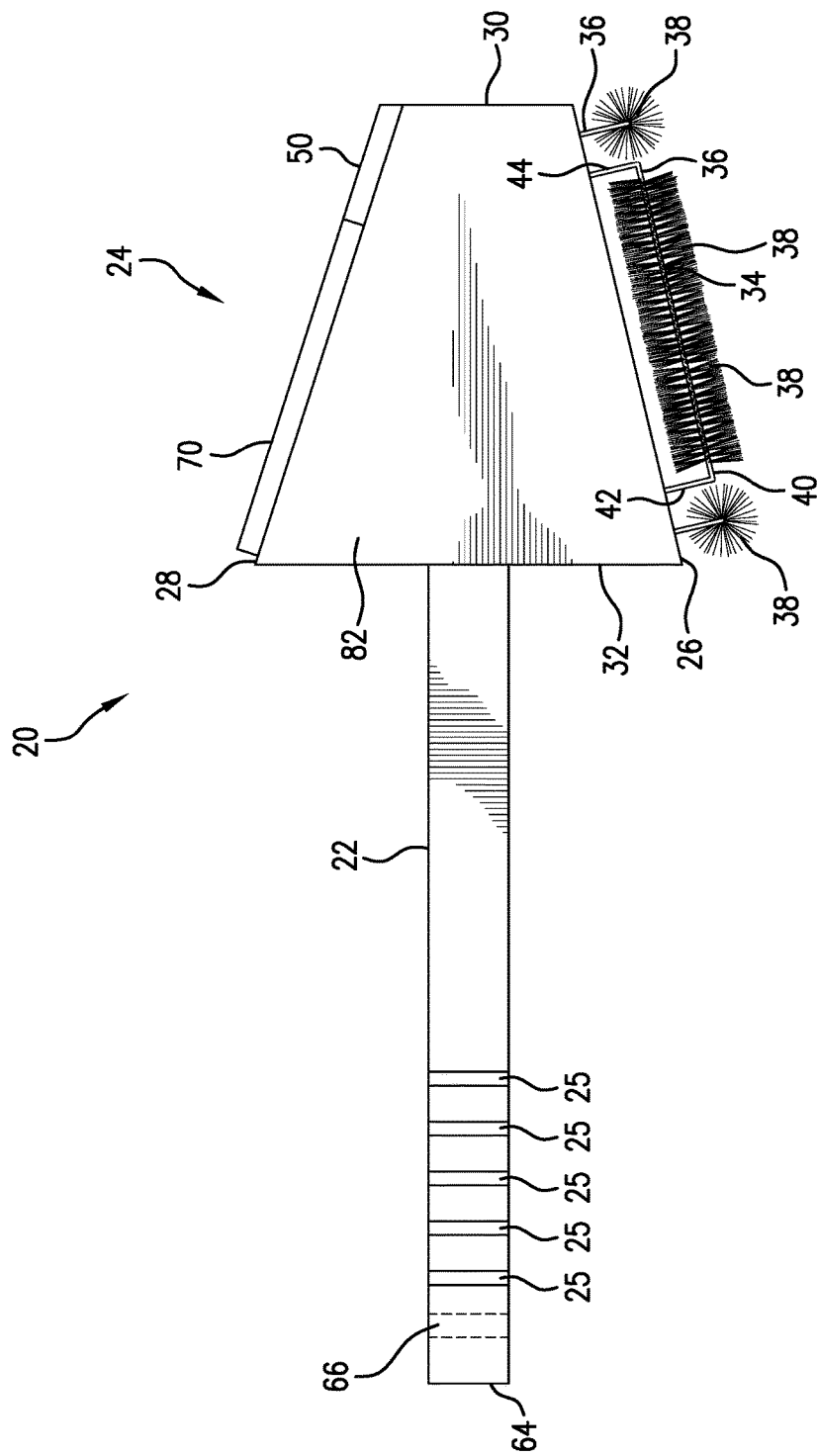
FIG. 4 is a right-side view of the grill brush.
Figure 5:
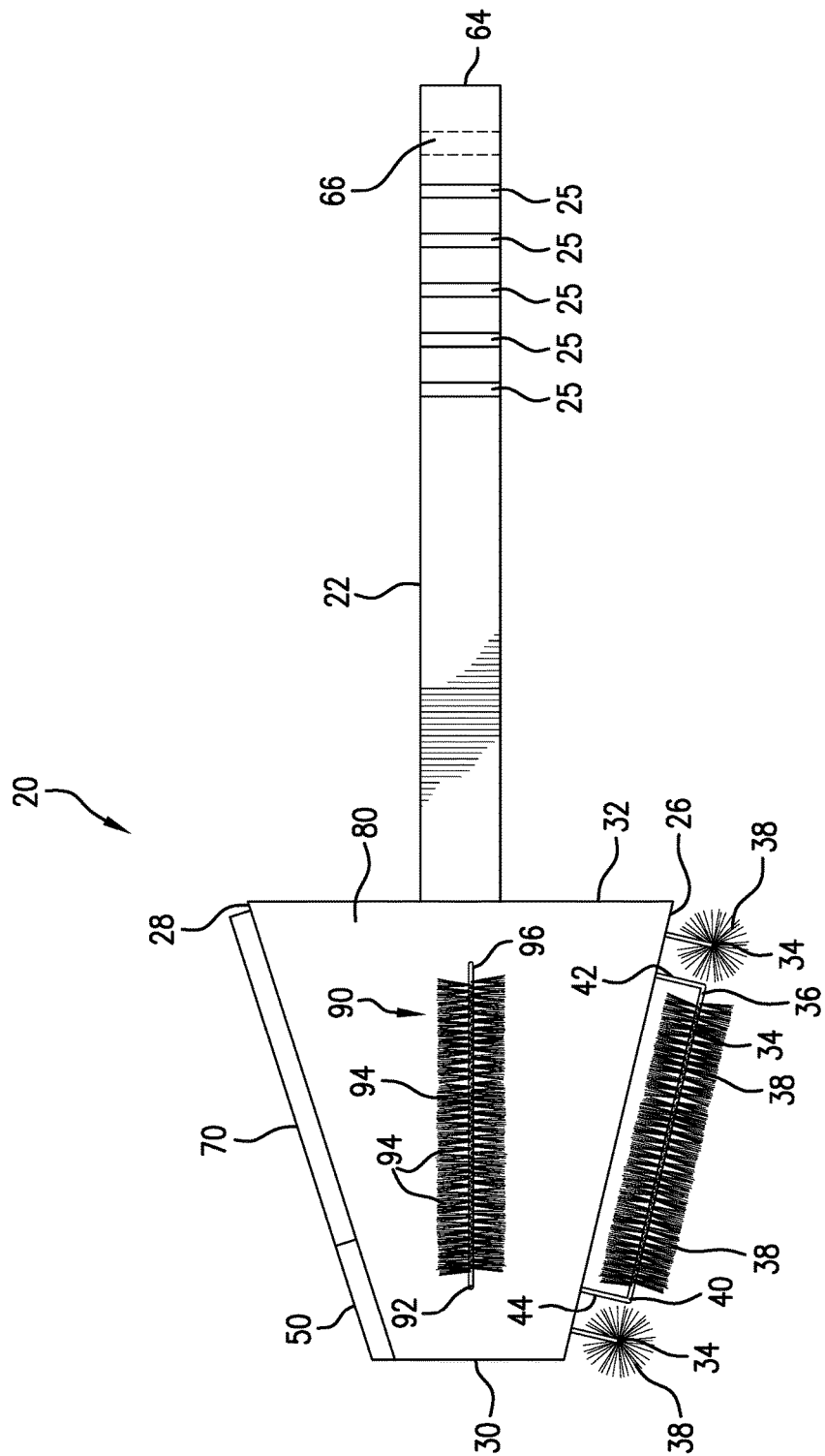
FIG. 5 is a left-side view of the grill brush.

Referring to FIGS. 1-5, there is shown grill brush 20 in accordance with one embodiment of the present invention. Grill brush 20 comprises handle 22 and head 24 which is attached to handle 22. Handle includes raised ribs 25 which allow a user to firmly grip handle 22. Head 24 has first face 26, second face 28, front end 30 and rear end 32. Grill brush 20 further comprises a plurality of brush members 34 attached to first face 26 of head 24. Each brush member 34 comprises support member 36 and ferromagnetic brush bristles 38 which are attached to support member 36. Support member 36 includes elongate section 40 and leg sections 42 and 44 which are attached, fixed or joined to first face 26 of head 24. Elongate section 40 has a longitudinally extending axis. In one embodiment, elongate section 40 is configured as twists of stiff wire strands. Each brush member 34 is formed by binding off ferromagnetic brush bristles 38 in the twists of the stiff wire strands that form elongate section 40 so that a round brush with spirally-arranged tufts of bristles is obtained. Such a technique is disclosed in U.S. Pat. No. 201,688, entitled "Brush", which issued Mar. 26, 1878. The disclosure of U.S. Pat. No. 201,688 is hereby incorporated by reference.

In other embodiments, each brush member 34 may have a configuration that is different than the configuration described in the foregoing description.

Referring to FIGS. 1, 2, 4 and 5, grill brush 20 further comprises magnet 50 that is attached to head 24. During use of grill brush 20, ferromagnetic brush bristles 38 contact the bars of a cooking grate of a barbecue or other cooking apparatus. A user moves grill brush 20 back and forth over the bar members of the cooking grate in order to remove grime and dirt. Ferromagnetic brush bristles 38 periodically become dislodged from support member 36 and become stuck on the cooking grate. Magnet 50 magnetically attracts the loose ferromagnetic brush bristles 38 that are on the cooking grate. In this embodiment, magnet 50 is attached or joined to second face 28 and is in proximity to front end 30 of head 24. Any suitable technique may be used to attach or join magnet 50 to second face 28. For example, magnet 50 may be adhered or bonded to second face 28. In another embodiment, second face 28 is formed with an integral structure that holds magnet 50 in place. In a further embodiment, magnet 50 is configured with a through-hole that is sized to receive screws or rivets. In such an embodiment, magnet 50 is screwed or riveted to second face 28. In one embodiment, as shown in FIGS. 1, 2, 4 and 5, grill brush 20 further comprises cleaning pad 70 that is attached or joined to second face 28 of head 24 and is adjacent to magnet 50. In one embodiment, cleaning pad 70 is a scour pad. In one embodiment, cleaning pad 70 is adhered or bonded to second face 28. Any suitable technique may be used to attach or join cleaning pad 70 to second face 28. The cleaning pad 70 is used to clean the cooking grate.

Handle 22 includes a first end that is attached to rear end 32 of head 24 and an opposite second end 64. Second end 64 includes through-hole 66 that allows a user to hang grill brush 20 by a screw, hook, nail or similar device when grill brush 20 is not in use.

In one embodiment, head 24 is solid and has left sidewall 80 and right sidewall 82. In one embodiment, grill brush 20 further comprises side brush member 90 which is attached or joined to left sidewall 80. Side brush member 90 comprises support member 92 and ferromagnetic brush bristles 94 that are attached to support member 92. Support member 92 includes elongate section 96 and leg sections 97 and 98. Leg section 97 and 98 are attached, fixed or joined to left sidewall 80 of head 24. Elongate section 96 has a longitudinally extending axis. In one embodiment, elongate section 96 is formed from twists of stiff wire strands as described in the aforementioned U.S. Pat. No. 201,688 wherein side brush member 90 is formed by binding off ferromagnetic brush bristles 94 in the twists of the stiff wire strands. Side brush member 90 is configured to be inserted between the individual bars of a cooking grate. In order to use side brush member 90, the user tilts grill brush 20 so that side brush member 90 fits between the bars of the cooking grate and then moves grill brush 20 back and forth so that side brush member 90 removes dirt and grime between the bars.

In another embodiment, side brush member 90 is attached or joined to right sidewall 82. In a further embodiment, grill brush 20 has side brush member 90 that is attached or joined to left sidewall 80 and another side brush member that is attached or joined to right sidewall 82.

In another embodiment, grill brush 20 does not use side brush member 90. In such an embodiment, there are no side brush members on left sidewall 80 or right sidewall 82.

Figure 6:
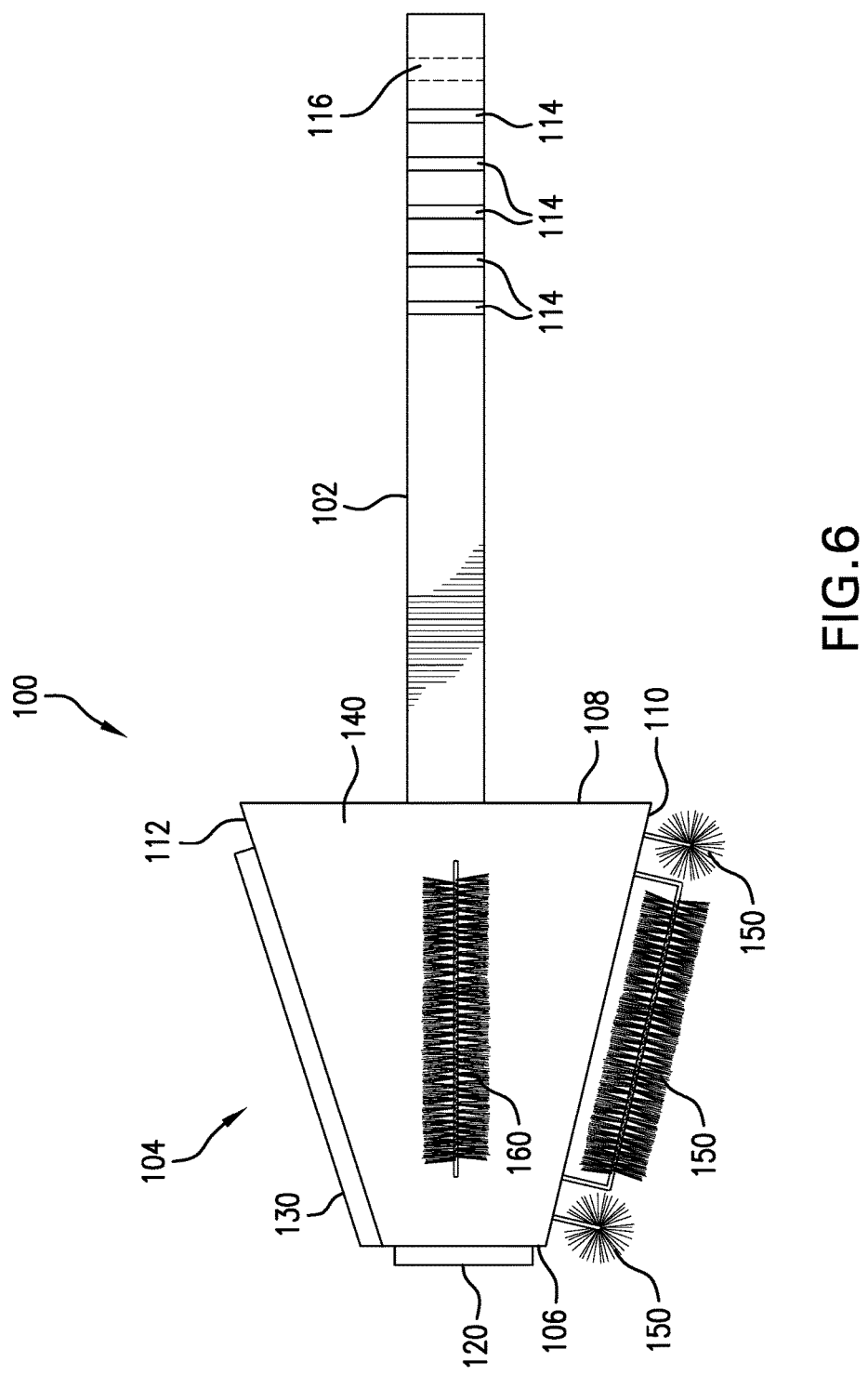
FIG. 6 is a left-side view of a grill brush in accordance with another embodiment of the present invention.

Referring to FIG. 6, there is shown grill brush 100 in accordance with another embodiment of the invention. Grill brush 100 comprises handle 102 and head 104. Handle 102 has substantially the same structure as handle 22. Head 104 has substantially the same structure as head 24. Head 104 includes front end 106, rear end 108, first face 110 and second face 112. Handle 102 is attached to rear end 108 and has ribs 114 and through-hole 116 which perform the same function as ribs 25 and through-hole 66, respectively, of grill brush 20. Grill brush 100 further comprises magnet 120 which performs the same function as magnet 50. In this embodiment, magnet 120 is attached to front end 106. Magnet 120 may be attached or joined to front end 106 by any suitable technique, including those techniques described in the foregoing description for attaching or joining magnet 50 to second face 28. Grill brush 100 includes cleaning pad or scour pad 130 that is attached or joined to second face 112. In an alternate embodiment, grill brush 100 does not use cleaning pad or scour pad 130. Head 104 further includes left sidewall 140 and a right sidewall which is not visible in FIG. 6. Grill brush 100 further includes a plurality of brush members 150 that are joined or attached to first face 110. Each brush member 150 has the same function and structure as one of the brush members 34 of grill brush 20. Grill brush 20 further comprises side brush member 160 that is attached or joined to left sidewall 140. Side brush member 160 has the same structure and purpose as side brush member 90 of grill brush 20.

Figure 7:
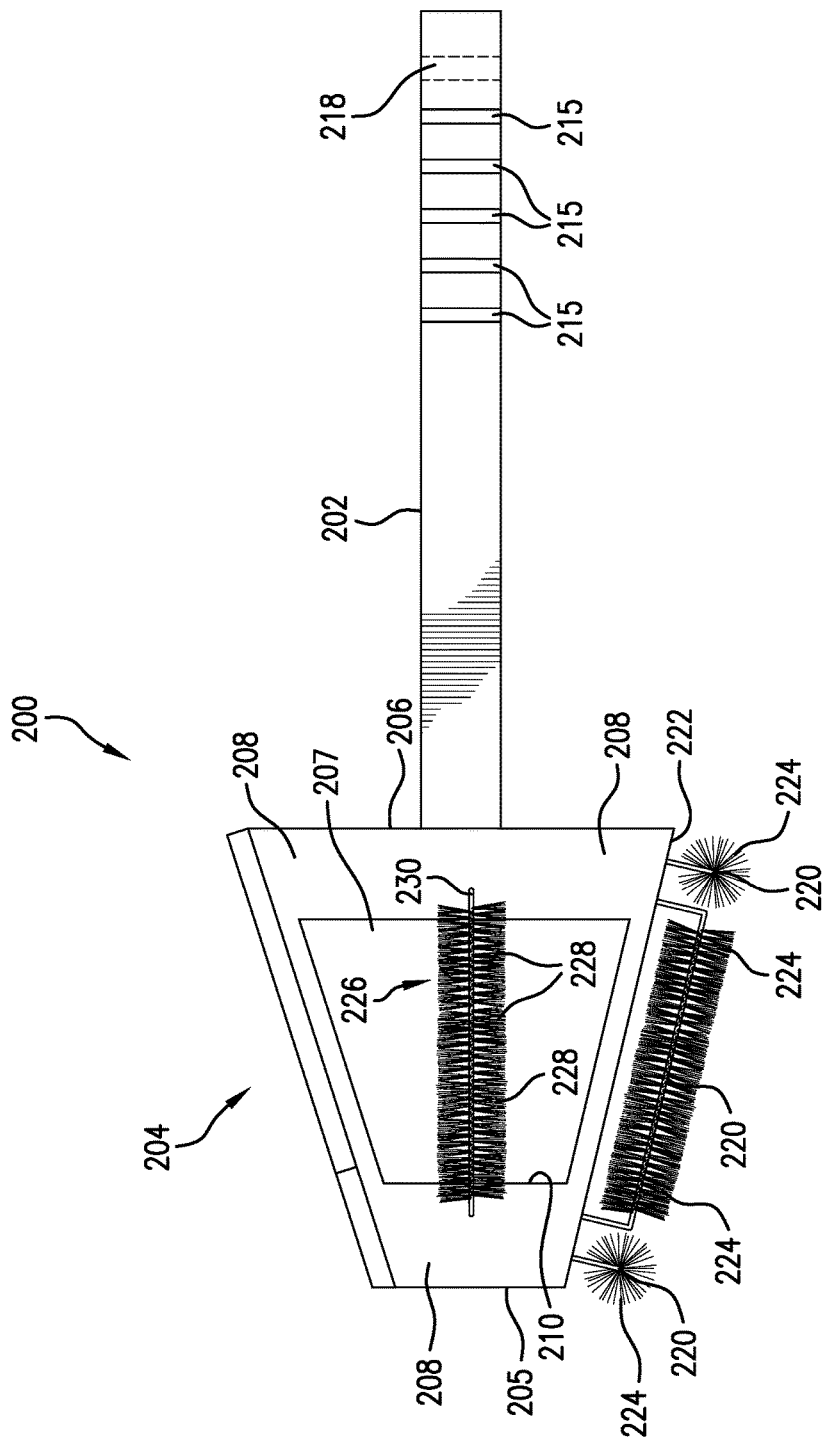
FIG. 7 is a left-side view of a grill brush in accordance with another embodiment of the present invention.

Referring to FIG. 7, there is shown grill brush 200 in accordance with another embodiment of the present invention. Grill brush 200 has handle 202 and head 204. Head 204 has front end 205 and rear end 206. Handle 202 is attached to rear end 206 of head 204. In this embodiment, head 204 is substantially hollow and has inner spatial region or space 207 that extends through head 204. Head 204 includes side structure 208 that has an opening 210 that leads into spatial region 207. Handle 202 includes ribs 215 and through-hole 218 which perform the same function as ribs 25 and through-hole 66, respectively, of grill brush 20. Grill brush 200 further includes brush members 220 that are attached or joined to first face 222 of head 204 and have the same structure as brush members 34 of grill brush 20. Brush members 220 have ferromagnetic bristles 224 which function in the same manner as ferromagnetic bristles 38 of grill brush 20. Grill brush 200 further includes side brush member 226 which has ferromagnetic bristles 228. Side brush member 226 functions in the same manner as side brush member 90 of grill brush 20. Side brush member 226 includes support member 230. In this embodiment, the leg sections (not shown) of support member 230 are attached or joined to corresponding portions of side structure 208.

Figure 8:
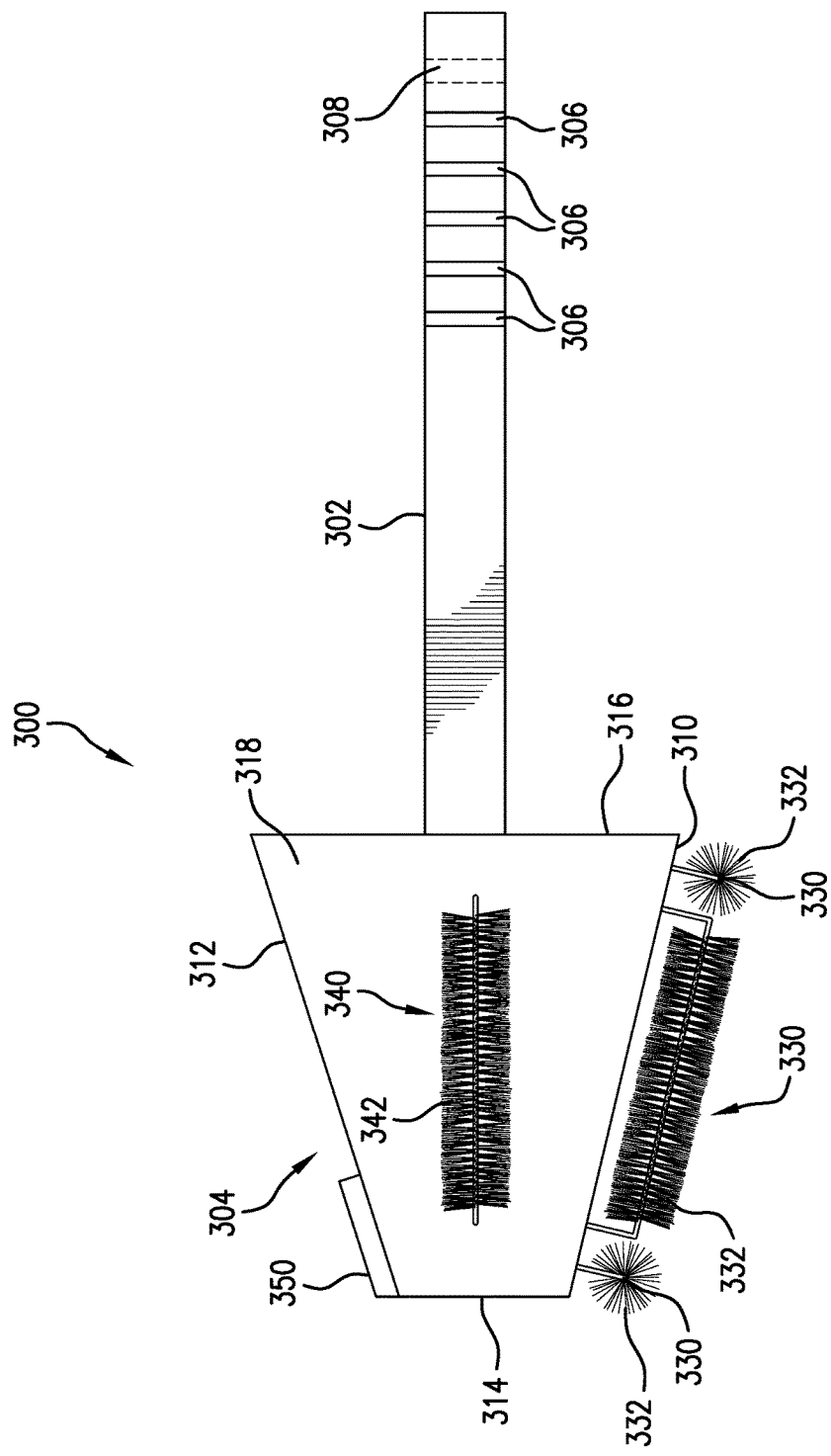
FIG. 8 is a left-side view of a grill brush in accordance with a further embodiment of the present invention.

Referring to FIG. 8, there is shown grill brush 300 in accordance with a further embodiment of the invention. Grill brush 300 has the same structure as grill brush 20 except that grill brush 300 does not utilize a cleaning or scour pad. Grill brush 300 comprises handle 302 and head 304. Handle 302 is attached to head 304. Handle 302 has the same structure as handle 22 of grill brush 20. Handle 302 includes raised ribs 306 which allow a user to firmly grip handle 302. Handle 302 also has through-hole 308 which performs the same function as through-hole 66 of grill brush 20. Head 304 comprises first face 310, second face 312, front end 314 and rear end 316. Head 304 further comprises left sidewall 318 and a right sidewall, which is not visible in FIG. 8. Grill brush 300 further comprises a plurality of brush members 330 that are attached to first face 310 of head 304. Each brush member 330 comprises ferromagnetic bristles 332. Brush members 330 have the same structure and function as brush members 34 and are therefore not described in detail. Grill brush 300 also includes side brush member 340 which is attached to left sidewall 318 and comprises ferromagnetic bristles 342. Side brush member 340 has the same structure and function as side brush member 90 of grill brush 20 and therefore is not described in detail. Grill brush 300 further includes magnet 350 which is attached or joined to second face 312. Magnet 350 performs the same function as magnet 50 of grill brush 20.

Magnet 350 may be attached or joined to second face 312 by any of the techniques discussed in the foregoing description. In this embodiment, grill brush 300 does not utilize a cleaning pad or scour brush. In an alternate embodiment, side brush member 340 is attached or joined to the right sidewall. In a further embodiment, magnet 350 is attached to front end 314.

Figure 9:
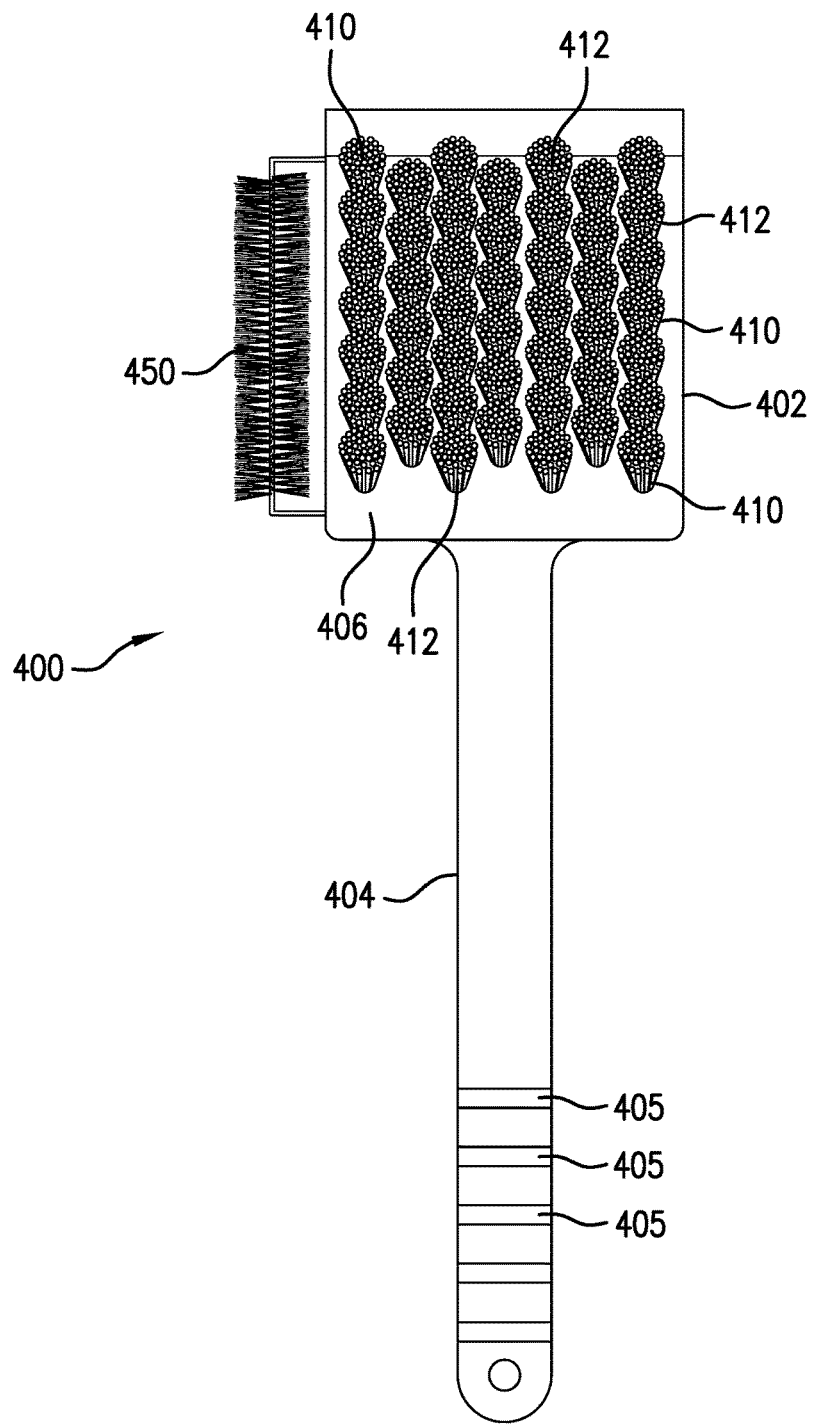
FIG. 9 is a bottom view of a grill brush in accordance with another embodiment of the present invention.

Referring to FIG. 9, there is shown a bottom view of grill brush 400 in accordance with another embodiment of the invention. Grill brush 400 comprises head 402 and handle 404. Handle 404 is attached to head 402 and has substantially the same structure as handle 22 of grill brush 20. Handle 404 includes raised ribs 405 which have the same function as ribs 25 of grill brush 20. Head 402 includes first face 406 and a plurality of groups 410 of ferromagnetic bristles 412. Each group 410 of ferromagnetic bristles 412 is attached or joined to first face 406. Any suitable technique known in the art may be used to attach, fix or join ferromagnetic bristles 412 to first face 406. In one embodiment, first face 406 includes a plurality of cavities, wherein each cavity corresponds to a particular group of 410 of ferromagnetic bristles 412. Each group of 410 of ferromagnetic bristles 412 is frictionally inserted into a corresponding cavity using techniques known in the art. Head 402 further comprises a second face (not shown). Grill brush 400 further comprises a magnet (not shown) that is attached or joined to the second face of head 402 which magnetically attracts loose ferromagnetic brush bristles 412 that are on the cooking grate of the barbecue grill or other cooking apparatus. Thus, the magnet of grill brush 400 performs the same function as magnet 50 of grill brush 20. Grill brush 400 also comprises a cleaning pad or scour pad (not shown) that is attached to the second face (not shown) of head 402. Grill brush 400 further comprises side brush member 450 which is attached to right sidewall of head 402. Side brush member 450 has the same structure and performs the same function as side brush member 90 of grill brush 20.

The head and handle portions of the grill brushes of the present invention can be fabricated from any one of a variety of suitable materials such as wood, plastic, resin, PVC, composite materials or rubber. The ferromagnetic bristles may be fabricated from any type of suitable ferromagnetic metals such as iron and steel. The magnets of the grill brushes discussed in the foregoing description may be configured as any one of a variety of suitable magnets, including permanent magnets such as Neodymium Iron Boron (NdFeB or NIB), Samarium Cobalt (SmCo), Alinco and Ceramic or Ferrite.

It is to be understood that the grill brushes 20, 100, 200, 300 and 400 may be used for purposes other than cleaning grills or cooking apparatuses.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A grill brush comprising:
a head including a front side having a first height, a rear side having a second height that is greater than the first height of the front side, a first face contiguous with the front side and the rear side and a second face that is contiguous with the front side and rear side, wherein the first face is substantially flat and the head has a hollowed-out region that is between the first face and the second face;
ferromagnetic brush bristles attached to the first face for contacting a cooking grate;
a magnet attached to the second face for magnetically attracting loose ferromagnetic brush bristles that have become dislodged from the first face and stuck on the cooking grate; and
a handle attached to the head.

2. The grill brush according to claim 1 wherein the magnet is in proximity to the front side of the head.

3. The grill brush according to claim 1 further comprising a cleaning pad attached to a portion of the second face of the head for cleaning a cooking grate.

4. The grill brush according to claim 3 wherein the cleaning pad comprises a scour pad.

5. The grill brush according to claim 1 wherein the head has a side portion and wherein the grill brush further comprises a side brush member attached to the side portion, the side brush member comprising a support member attached to the side portion and ferromagnetic bristles attached to the support member.

6. The grill brush according to claim 1 wherein the is first face is substantially flat.

7. The grill brush according to claim 1 wherein the magnet is fabricated from a material chosen from Neodymium Iron Boron (NdFeB or NIB), Samarium Cobalt (SmCo), Alinco and Ceramic or Ferrite.

8. The grill brush according to claim 1 wherein the second face includes an integral structure that holds the magnet in place.

9. The grill brush according to claim 1 wherein the head is fabricated from a material chosen from the group including plastic, resin, PVC, composite materials and rubber.

* * * * *